United States Patent
Shah (10) Patent No.: US 11,496,416 B2
(45) Date of Patent: Nov. 8, 2022

(54) ENHANCE COMMUNICATION OF NETWORK TRAFFIC

(71) Applicant: Apple Inc., Cupertino, CA (US)

(72) Inventor: Birju N. Shah, Redwood City, CA (US)

(*) Notice: Subject to any disclaimer, the term of this patent is extended or adjusted under 35 U.S.C. 154(b) by 0 days.

(21) Appl. No.: 16/942,455

(22) Filed: Jul. 29, 2020

(65) Prior Publication Data

US 2020/0358717 A1    Nov. 12, 2020

Related U.S. Application Data

(63) Continuation of application No. 15/999,279, filed as application No. PCT/US2017/018061 on Feb. 16, 2017, now abandoned.

(Continued)

(51) Int. Cl.
*H04L 47/70* (2022.01)
*G06F 8/65* (2018.01)
(Continued)

(52) U.S. Cl.
CPC .............. *H04L 47/829* (2013.01); *G06F 8/65* (2013.01); *H04L 41/12* (2013.01); *H04L 45/24* (2013.01);
(Continued)

(58) Field of Classification Search
CPC ....... H04L 47/829; H04L 49/25; H04L 45/24; H04L 45/302; G06F 8/65
See application file for complete search history.

(56) References Cited

U.S. PATENT DOCUMENTS

| 7,403,488 B2 | 7/2008 | Gu et al. |
| 8,477,616 B1 | 7/2013 | Rogers et al. |

(Continued)

FOREIGN PATENT DOCUMENTS

| CN | 101291265 | 10/2008 |
| CN | 101298649 | 11/2008 |

(Continued)

OTHER PUBLICATIONS

Bruno et al; "Avionics Full Duplex Ethernet and the Time Sensitive Networking Standard"; May 2015; IEEE 802.1 Interim Meeting, pp. 1-31. (Year: 2015).*

(Continued)

*Primary Examiner* — Robert C Scheibel
(74) *Attorney, Agent, or Firm* — Kowert, Hood, Munyon, Rankin & Goetzel, P.C.; Paul T. Seegers; Dean M. Munyon (57) ABSTRACT

Techniques are disclosed relating to enhancing communication of network traffic. In various embodiments, a computer system receives topology information and traffic information. The topology information describes resources of a network that are usable to communicate a plurality of streams among nodes in the network and includes information about a first path and a second path connecting two nodes. Traffic information describes demands for communicating the plurality of streams and indicates demands for communicating a first stream and a second stream between the two nodes. In such an embodiment, the computer system determines, using the topology information and the traffic information, a network schedule that indicates that the first stream is to be communicated over the first path and that the second stream is to be communicated over the second path.

18 Claims, 9 Drawing Sheets

Related U.S. Application Data (60) Provisional application No. 62/296,051, filed on Feb. 16, 2016.

(51) Int. Cl.

| | | |
|---|---|---|
| *H04L 45/24* | (2022.01) | |
| *H04L 45/302* | (2022.01) | |
| *H04L 49/25* | (2022.01) | |
| *H04L 41/12* | (2022.01) | |
| *H04L 67/00* | (2022.01) | |

(52) U.S. Cl.
CPC ......... *H04L 45/302* (2013.01); *H04L 47/827* (2013.01); *H04L 49/25* (2013.01); *H04L 67/34* (2013.01)

(56) References Cited

U.S. PATENT DOCUMENTS

| 2002/0114332 | A1* | 8/2002 | Apostolopoulos ...... H04L 45/34 370/392 |
|---|---|---|---|
| 2002/0141425 | A1 | 10/2002 | Merani et al. |
| 2007/0183458 | A1 | 8/2007 | Bouazizi et al. |
| 2008/0279204 | A1* | 11/2008 | Pratt, Jr .............. H04W 56/002 370/406 |
| 2012/0109424 | A1* | 5/2012 | Fervel .................. B64C 13/505 701/3 |
| 2013/0028072 | A1* | 1/2013 | Addanki ............. H04L 41/0659 370/218 |
| 2015/0295843 | A1* | 10/2015 | Ma ...................... H04L 12/4015 370/412 |
| 2016/0294721 | A1* | 10/2016 | Varadarajan .......... H04L 47/621 |
| 2016/0335073 | A1* | 11/2016 | Hong ........................ G06F 8/65 |

FOREIGN PATENT DOCUMENTS

| CN | 101404601 | 4/2009 |
|---|---|---|
| CN | 101534230 | 9/2009 |

OTHER PUBLICATIONS

Wilfried Steiner, et al., "SMT-Based Formal Verification of a TTEthernet Synchronization Function," FMICS 2010, LNCS6371, pp. 148-163.
Deterministic Real-Time Ethernet Platform; Time-Triggered Ethernet—A Powerful Network Solution for Multiple Purpose, Copyright © TTTech Computertechnik AG, 2018, 14 pages.
TTETools—TTEthernet Development Tools v4.3; The Software Tools for Developing a TTEthernet Network, Copyright © TTTech Computertechnik AG, 2018, 2 pages.
International Search Report and Written Opinion in PCT Application No. PCT/US2017/018061 dated May 3, 2017, 11 pages.
International Preliminary Report in PCT Application No. PCT/US2017/018061 dated Feb. 16, 2018, 6 pages.

* cited by examiner

ENHANCE COMMUNICATION OF NETWORK TRAFFIC

The present application is a continuation of U.S. application Ser. No. 15/999,279, filed Aug. 16, 2018, which is a U.S. National Application under 35 U.S.C. § 371 of PCT Appl. No. PCT/US17/18061, filed Feb. 16, 2017, which claims priority to U.S. Provisional Appl. No. 62/296,051, filed Feb. 16, 2016; the disclosures of each of the above-referenced applications are incorporated by reference herein in their entireties.

BACKGROUND

Technical Field

This disclosure relates generally to computer networks, including to enhancing how a network communicates traffic with different communication demands.

Description of the Related Art

A computer network may have limited resources and need to communicate network traffic with different demands relating to bandwidth, latency, jitter, and/or data loss. For example, an audio stream to a user may have low latency demands, but permit small amounts of data loss—e.g., a call between two people may be difficult if there is a significant delay, but the call may be still understandable in spite of some packet loss. On the other hand, communication of a large file across a network may have high bandwidth and integrity demands, but latency may be less of a concern. Modern computer networks may attempt to schedule traffic in a manner that considers these demands in order to ensure that particular streams of traffic are afforded certain levels of quality of service (QoS).

SUMMARY

The present disclosure describes embodiments in which a network planner is used to enhance how network traffic is communicated among nodes in a network. In various embodiments, the network planner may analyze information about a network and information about streams of network traffic being communicated over the network (e.g., demands regarding latency, bandwidth, frequency of communication, redundancy, etc.). The network planner may then generate a network schedule that describes how traffic should be communicated in order to accommodate for the various traffic demands. The network schedule may be distributed to various network resources, such as switches and end nodes, so that network traffic is communicated in accordance with the network schedule.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

As used herein, the terms "first," "second," etc. are used as labels for nouns that they precede, and do not imply any type of ordering (e.g., spatial, temporal, logical, etc.) unless specifically stated. For example, when a network node conveys a first stream and a second stream, the terms "first" and "second" do not imply that the first stream is sent before sending the second stream. In other words, the "first" and "second" streams may be sent in any suitable order or even in parallel.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

Figure 1:
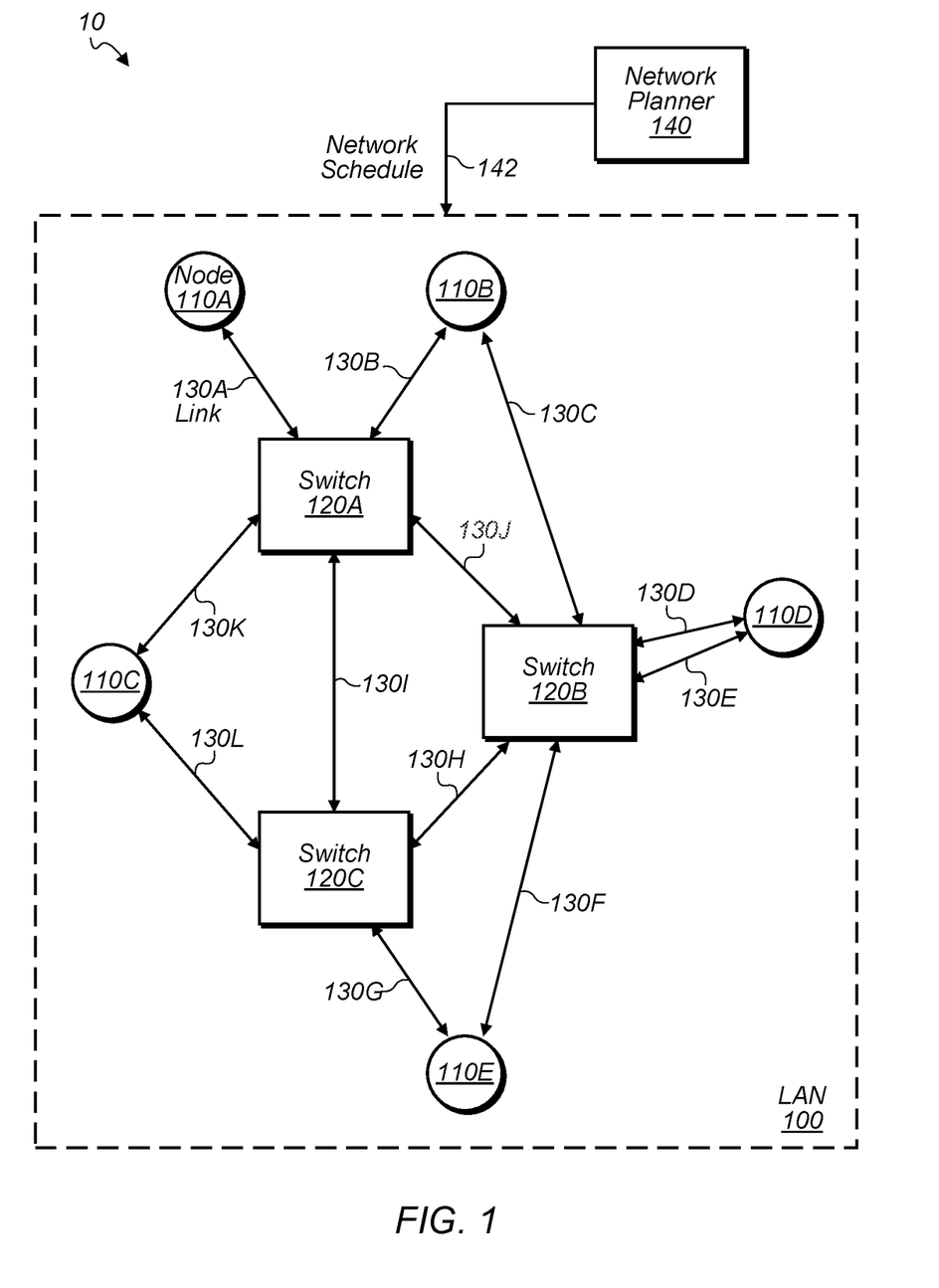
FIG. 1 is a block diagram illustrating an example of a system for enhancing communication of network traffic.

Turning now to FIG. 1, a block diagram of a system 10 for enhancing communication of network traffic is depicted. In the illustrated embodiment, system 10 includes a local area network (LAN) 100, which includes multiple nodes 110 coupled to switches 120 via one or more links 130A-K. In the illustrated embodiment, system 10 also includes a network planner 140 that determines a network schedule 142 for LAN 100 as discussed below.

Local area network (LAN) 100, in one embodiment, is configured to communicate various streams of network traffic among nodes 110A-E. In various embodiments, LAN 100 is configured such that it includes multiple paths between a given pair of nodes, in some instances, and a single path between nodes, in other instances. For example, as shown, node 110B may communicate with node 110D over a path having links 130C and 130D or a path having links 130B, 130J, and 130E. In this example, however, node 110A is coupled to switch 120A via a single link 130A—thus, any communication between node 110A and switch 120A only has one potential path. Still further, in various embodiments, nodes 110 may include multiple interface ports in order to support multiple links 130. For example, as shown, node 110B may include a first network port to support link 130B and a second, separate port to support link 130C. In many instances, including redundant paths may improve the reliability of network 100 and increase traffic throughput between nodes 110. In some embodiments, various links 130 may also have different bandwidths and latencies. For example, link 130J may have a higher bandwidth and a lower latency than the bandwidth and latency of link 130A. Switches 120 may also have different performance capabilities. As a result, LAN 100 may have various limitations based on the configuration of network 100 and the resources being used.

Nodes 110A-E, in one embodiment, are computing devices configured to send and/or receive streams of network traffic. In some embodiments, traffic may generally be classified as 1) time triggered (TT), 2) rate constrained (RC), 3) best effort (BE), and 4) time sync (TS). Time-triggered traffic is traffic that may be sent on a fixed schedule for static intervals. Packets may have consistent, predictable payload sizes, which may be known at design time. This type of traffic may not tolerate congestion-based loss, however. Rate-constrained traffic is traffic that may need to be sent at a consistent average bit rate, which may be known at design time. Packets, however, may have variable payload sizes and may not be sent on a fixed schedule. This type of traffic may also not tolerate congestion-based loss and have a demand for time sensitive delivery. Best-effort traffic is traffic for which timely delivery may not be guaranteed. This type of traffic may not be sent on a fixed schedule, and its bandwidth usage may be unknown at design time. Time-sync traffic is traffic that is used to synchronize network time across nodes 110. This type of traffic may be sent at fixed intervals based on local clocks and may be tolerant of jitter. In one embodiment, this traffic is compliant with IEEE 802.1AS. In other embodiments, traffic may be classified differently. In some embodiments, particular streams may need to be communicated redundantly—e.g., streams conveying particularly important data. In such an embodiment, conveying two instances of the same stream over separate paths may be preferable to using an acknowledgment-retransmission scheme (such as employed by the transmission control protocol (TCP)), as implementing redundant streams may require less processing overhead. In some embodiments, a given node 110 may also multicast a stream to multiple other nodes 110. As used herein, the term "multicast" is to be interpreted according to its understood meaning in the art, and includes sending a stream in parallel to multiple nodes. In some embodiments, a given node 110 may multicast a stream that is delivered redundantly to only a subset of nodes receiving the stream. That is, a node 110 may send a single instance of the multicasted stream to one node 110 while also sending two or more instances of the stream over separate paths to another node 110.

Nodes 110 may correspond to any suitable devices communicating over a network. In some embodiments, nodes 110 may be devices within a home network such as desktop and laptop computers, mobile devices, smart television, smart appliances, etc. In some embodiments, nodes 110 are machines within a fabrication plant that are configured to perform various operations. In some embodiments, nodes 110 are microcontrollers connected to a bus. In some embodiments, nodes 110 are electronic control units (ECUs) in a vehicle such as an aircraft, boat, automobile, recreational vehicle, etc. As used herein, the term "electronic control unit (ECU)" is to be interpreted according to its understood meaning in the art, and includes an embedded system that controls one or more operations of a vehicle. As used herein, the term "vehicle network" refers to an internal communications network that interconnects components (e.g., ECUs) inside a vehicle. In such an embodiment, examples of time-triggered traffic may include steering-wheel-angle messages generated for a steering ECU, torque-control messages and wheel-speed messages generated for a motor ECU, brake control messages generated for a brake-system ECU, etc. Examples of rate-constrained traffic may include audio and video streams from a backup camera ECU, LIDAR and RADAR streams associated with collision-avoidance ECUs, etc. Examples of best-effort traffic may include infotainment messages generated by an infotainment ECU, diagnostic messages generated by various ECUs, software updates, etc.

Switches 120, in one embodiment, are configured to route streams between nodes 110. Accordingly, switches 120 may receive packets of various streams from nodes 110, determine which links 130 to send the packets over, and queue the packets until they can be scheduled for transmission. In some embodiments, switches 120 support Ethernet; however, in other embodiments, other networking protocols may be supported. In some embodiments, switches 120 may also facilitate multicasting by duplicating a received stream and sending multiple instances of the stream out over links 130 via separate switch ports. Although switches 120 are shown separately from nodes 110, switches 120 may also be considered as nodes in LAN 100 as well.

Network planner 140, in one embodiment, is software that is stored on a non-transitory computer readable medium and is executable by a computer system (such as discussed below with respect to FIG. 7) to determine a network schedule 142 for LAN 100. In various embodiments, this schedule may specify time slots when particular streams are to be communicated by nodes 110 and switches 120. This schedule may also indicate the paths (or more specifically the particular links 130 making up the paths) to be used during these time slots. As discussed below with respect to FIG. 2, in various embodiments, network planner 140 determines a network schedule 142 by analyzing received information about the topology of LAN 100 and information describing the streams being communicated over LAN 100. This topology information may identify various network resources (e.g., nodes 110, switches 120, and links 130), indicate how those resources are connected, and specify the capabilities of those resources. Stream information may identify the publishers (i.e., sources) and subscribers (i.e., destinations) of particular streams as well as indicate the various demands for communicating the streams such as desired transmission intervals, known payload sizes, latency constraints, frequency of transmissions, redundant communication, etc. In various embodiments, network planner 140 is executable to determine a schedule 142 that enhances communication in a manner that accommodates these demands.

In some embodiments, network planner 140 is executable to create a schedule 142 that effectively balances loads across resources in LAN 100. For example, planner 140 may analyze the bandwidths of links 130 and throughputs of switches 120 in order to appropriately schedule streams. Planner 140 may then schedule higher bandwidth streams over higher bandwidth links while scheduling lower bandwidth streams over lower bandwidth links. In other words, rather than scheduling all traffic between two nodes 110 over a single path when multiple paths exist, planner 140 may create a schedule 142 that distributes the traffic over the multiple paths.

In some embodiments, network planner 140 is also able to take into account nodes 110 that have multiple network ports in its load balancing analysis. For example, as shown, node 110D may include a first port for communicating over link 130D and a second port for communicating over link 130E. Still further, these ports may be coupled to links that have different latencies and/or bandwidths. In response to receiving network topology information that specifies these characters, network planner 140 may create a schedule 142 that routes a first stream from node 110D out of a port coupled to link 130D and routes a second stream from node 110D out of a port coupled to link 130E. In some instances, these two streams may also be destined for the same node.

Based on network planner 140's analysis, in some embodiments, schedule 142 may also assign time slots to a particular stream that are associated with different paths. For example, schedule 142 may specify that the stream is to be communicated for a first interval via one path and communicated for a second interval via a second path. In some embodiment, schedule 142 may specify that a particular stream be split across multiple paths. Thus, a 1 Gb/s stream, for example, could be distributed across two 500 Mb/s links 130. An example of load balancing across multiple paths is discussed below with respect to FIG. 4A.

In various embodiments, network planner 140 is executable to create a schedule 142 that accommodates redundant transmissions of streams while also permitting non-redundant transmissions of streams. Accordingly, planner 140 may receive stream information indicating that redundant transmission is demanded for a particular stream, but not demanded for some other stream. Planner 140 may then attempt to identify separate paths for communicating redundant instances (i.e., copies) of the stream, and attempt to identify a single path for communicating the other stream. If it is unable to identify these paths, planner 140 may indicate that it cannot satisfy this request and indicate the particular flaw(s) in LAN 100 that prevents it from doing so. If planner 140 is able to identify separate paths, planner 140 may then indicate in schedule 142 the time slots for communicating the streams over the paths. Notably, in various embodiments, network planner 140 is able to create a schedule 142 for routing redundant transmissions in a network (i.e., LAN 100) that does not necessarily have redundant links between all nodes in a network (or, said differently, planner 140 does not require two or more copies of a network in order to permit scheduling redundant transmissions of streams).

In some embodiments, network planner 140 is also able to create a schedule 142 that accommodates a particular stream being multicast to a set of nodes 110 such that only a subset of the nodes 110 receive redundant instances of the stream. For example, node 110B may communicate a stream to nodes 110A and 110E, but communicate two redundant instances of the stream to only node 110E. Accordingly, planner 140 may create a schedule 142 that specifies overlapping time slots so that the stream can be multicast to each node in the set and time slots on separate paths so that the stream can be redundantly transmitted to the subset of nodes 110. Examples of redundant transmission during multicasting a stream are discussed below with respect to FIGS. 4B and 4C.

In various embodiments, schedule 142 is distributed to nodes 110 and switches 120 to ensure that they are aware of schedule 142 and communicate in accordance with schedule 142. In some embodiments, schedule 142 may be disseminated to nodes 110 and switches 120 when LAN 100 is assembled. In some embodiments, schedule 142 may also be disseminated in conjunction with a software update. For example, in an embodiment in which LAN 100 is a vehicle network, schedule 142 may be included in a software update for the vehicle, which may be received via an over-the-air update (i.e., an update received wirelessly through a wide area network such as the Internet). In some embodiments, a given node 110 or switch 120 may not receive the entire schedule 142, but rather a portion of the schedule 142 that is applicable to that node 110 or that switch 120 as discussed below with respect to FIG. 2. This may reduce the amount of schedule information stored by a given node. In one embodiment, planner 140 may facilitate distribution of schedule 142; in other embodiments, distribution may be handled by a separate entity.

Figure 2:
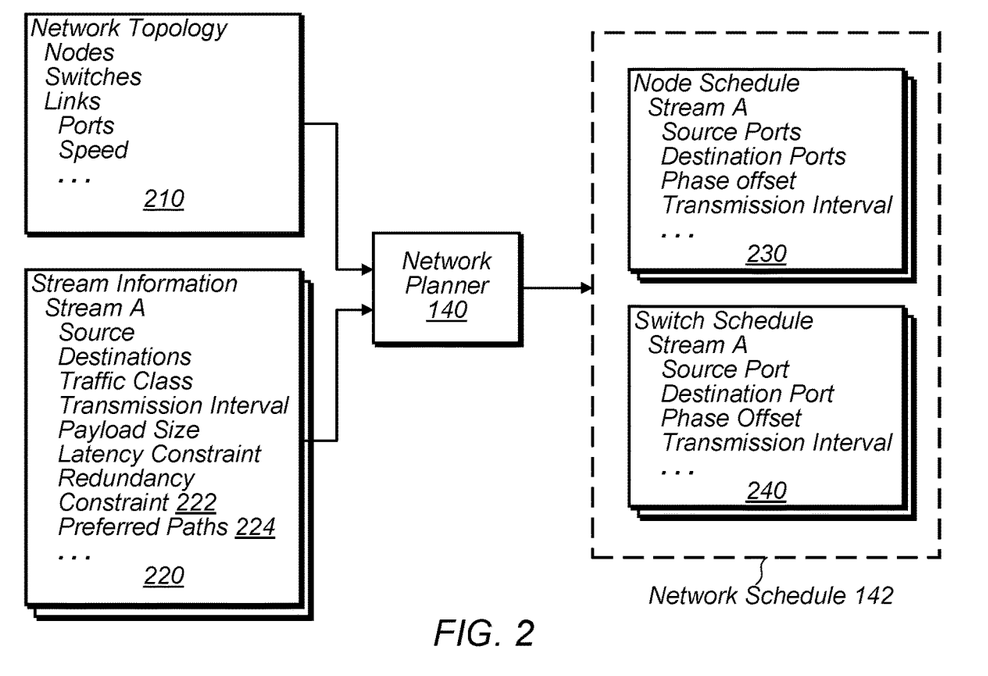
FIG. 2 is a block diagram illustrating an example of a network planner.

Turning now to FIG. 2, a block diagram illustrating operation of network planner 140 is presented. In the illustrated embodiment, network planner 140 receives a network topology 210 and stream information 220, and generates a network schedule 142 that includes node schedules 230 and switch schedules 240. In other embodiments, network planner 140 may be implemented differently than shown. In some embodiments, elements 210-240 may include more (or less) information than shown.

Network topology 210, in one embodiment, is information describing the topology (i.e., layout) of LAN 100. As shown, topology 210 may identify the nodes 110, the switches 120, and the links 130 that make up LAN 100. Topology 210 may also explain how these resources are connected. Accordingly, as shown, topology 210 may specify the ports used by nodes sharing a link 130. For example, topology 210 may indicate the specific network ports used by node 110D and switch 120B to communicate over link 130E. Topology 210 may also indicate the particular speeds of each link—e.g., their respective latencies and supported bandwidths, in some embodiments.

Stream information 220, in one embodiment, identifies the streams to be communicated over LAN 100 and specifies various characteristics about the streams. As shown, information 220 may indicate the source of a particular stream (e.g., a "Stream A") and its destinations. Information 220 may indicate a traffic classification—e.g., whether a stream is TT, RC, BE, or TS as discussed above with respect to FIG. 1. Information 220 may also indicate demands such as a transmission interval (how frequently a streams needs to be transmitted), a payload size (an indicator of desired bandwidth), a latency constraint (how quickly a stream needs to be delivered to a destination), etc.

In some embodiments, stream information 220 also indicates, via redundancy constraint 222 in FIG. 2, whether a particular stream warrants redundant communication and/or the extent of the redundancy that is requested. For example, information 222 may indicate not only that a stream is to be communicated redundantly, but also that, e.g., three instances of the stream should be communicated. In some embodiments, redundancy constraint 222 may also be specified on a per-subscriber basis (i.e., per-destination basis). For example, as will be discussed with respect to FIG. 4B, stream information 220 may specify that node 110E should receive redundant instances of a stream and that node 110A should receive a single copy of that stream. Accordingly, planner 140 may then produce a network plan 142 that accounts for these redundancy criteria. Notably, by allowing redundancy to be specified at such a fine granularity, network planner 140 is able to create a schedule 142 that accommodates a multicast stream that is sent redundantly to some, but not all nodes 110.

In some embodiments, stream information 220 also indicates one or more preferred paths 224 for a given stream. For example, if node 110B is communicating two redundant instances of a stream to node 110D, information 220 may specify a preference for using links 130C and 130J to covey this communication. In such an embodiment, network planner 140 may weight links 130C and 130J more favorably when determining how to route the stream to between nodes 110B and 110D. In some instances, however, network planner 140 may determine to not route the instances of the stream over link 130C and/or link 130J based on consideration of various other factors (e.g., the available bandwidth, link 130C's and 130J's latencies, the desire to route higher priority streams over links 130C or 130J etc.). In some embodiments, preferred paths 224 may also indicate a preference to not use particularly paths as well. For example, information 220 may indicate a preference to not route a particular stream over link 130C.

Node schedules 230, in one embodiment, are the portions of schedule 142 that are applicable to a respective one of nodes 110. (As noted above, in some embodiments, a given node 110 may not receive the entire schedule 142, but rather merely the portion that is applicable to that node 110.) As shown, a node schedule 230 may indicate the particular streams being transmitted and/or received by a given node 110. In some embodiments, the node schedule 230 may also indicate the particular source port(s) and destination port(s) used to communicate the stream. That is, rather than indicate an identifier for a given link, the link may be identified to a node 110 in terms of the node ports and/or switch ports to which the link 130 is coupled. For example, a schedule 230 for node 110D may indicate that it is to transmit a stream from its source port #2 to switch 120B's destination port #4 (in this example, source port #2 and destination port #4 are the physical ports to which link 130E is coupled). In various embodiments, the node schedule 230 also indicates the time slot or time slots for when the node 230 is to communicate the stream.

In the illustrated embodiment, a given time slot is expressed as a phase offset and transmission interval. In some embodiments, network schedule 142 is applicable to a repeating communication window (i.e. communication cycle). For example, schedule 142 may specify how traffic is to be communicated within a two-minute window. At the end of this two-minute cycle, the cycle may begin again. A phase offset indicates when a transmission is to begin within this cycle. For example, a phase offset may specify that a transmission begin at 20 ms into the cycle. A transmission interval indicates how frequently a transmission is to be repeated. For example, a transmission interval may specify that a transmission is to occur every 100 ms. Accordingly, using a phase offset of 20 ms and interval of 100 ms may result in transmissions at 20 ms, 120 ms, 220 ms, and so forth. Thus, a time slot for communicating a given stream may be expressed in terms of a phase offset and a transmission interval. In other embodiments, a time slot may be expressed differently.

Switch schedules 240, in one embodiment, are the portions of schedule 142 that are applicable to a respective one of switches 120. As with a node schedule 230, a given switch schedule 240, in some embodiments, may identify the streams to be communicated by a given switch 120. Schedule 240 may indicate the links 130 to be used for a given stream in terms of source and destination ports. (Notably, in some instances, a schedule 240 may specify a single reception port for a given stream and multiple transmission ports for the stream. In doing so, schedule 240 may cause the switch 120 to create two duplicate instances of the stream that are transmitted over the separate transmission ports.) Schedule 240 may also indicate the time slots to be used for a given stream in terms of a phase offset and transmission interval.

An algorithm for generating a network schedule 142 from network topology 210 and stream information 220 is discussed below with respect to FIG. 5.

Figure 3:
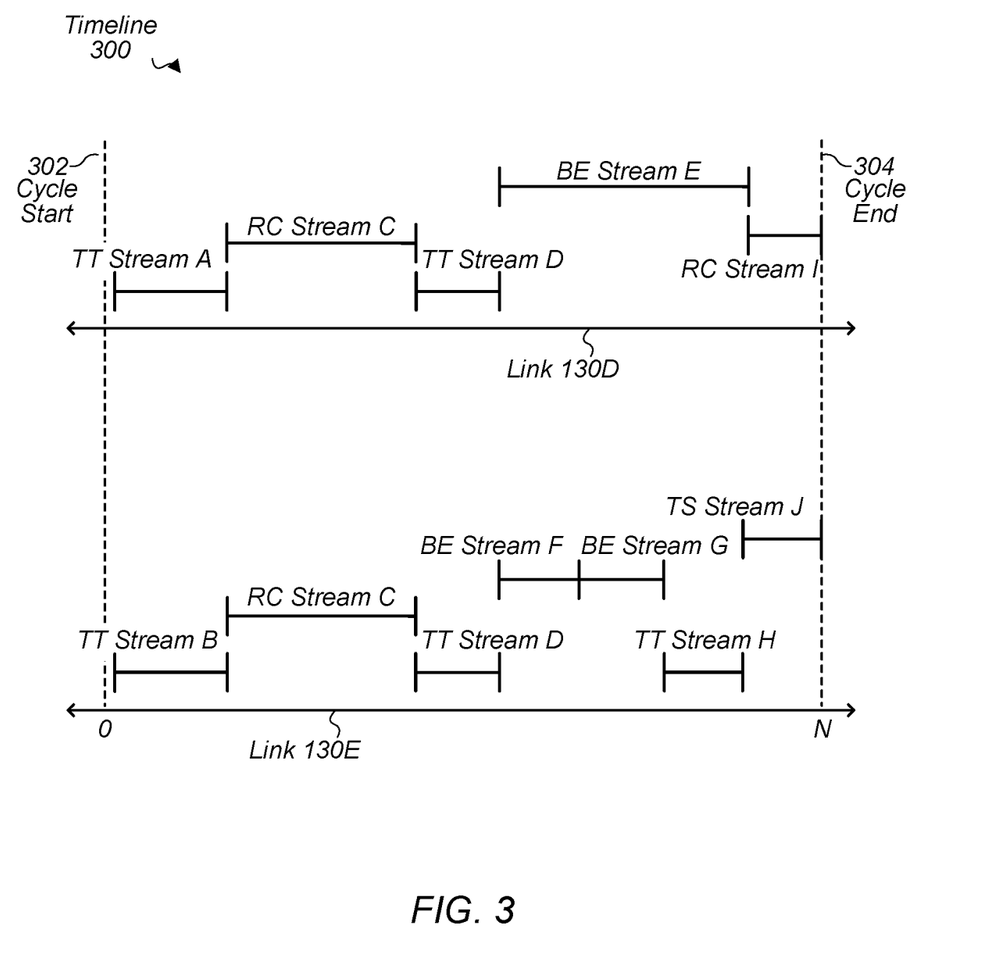
FIG. 3 is an example of a timeline that indicates when various streams should be communicated as determined by the network planner.

Turning now to FIG. 3, an example of timeline 300 for communicating traffic in accordance with a network schedule 142 is depicted. More specifically, in this example, timeline 300 pertains to the communication of traffic between switch 120B and node 110D over links 130D and 130E during a given communication cycle between start 302 and end 304. Accordingly, in some embodiments, switch 120B and node 110D may exchange traffic in the depicted manner in response to receiving a switch schedule 240 and node schedule 230, respectively.

As shown, timeline 300 may begin with the transmission of two time-triggered (TT) streams A and B over links 130D and links 130E. As noted above, schedule 142 may specify the transmission of streams A and B over separate links in order to better balance the loads across links 130D and 130E. In this example, timeline 300 may then include redundant transmissions of rate-constrained (RC) stream C and TT streams D over links 130D and 130E. Next, best-effort (BE) streams E, F, and G are communicated across links. (In some embodiments, rather than specify time slots for streams E, F, and G, schedule 142 may merely indicate that these time slots have not been allocated, and thus, are available for BE traffic.) Lastly, a TT stream H, RC stream I, and time-sync (TS) stream J are communicated. As noted above, in some embodiments, a TS stream may be used to synchronize time across nodes 110 and switches 120—and thus ensure that the start periods 302 and end periods 304 are coordinated across all nodes 110 and switches 120.

Figure 4A:
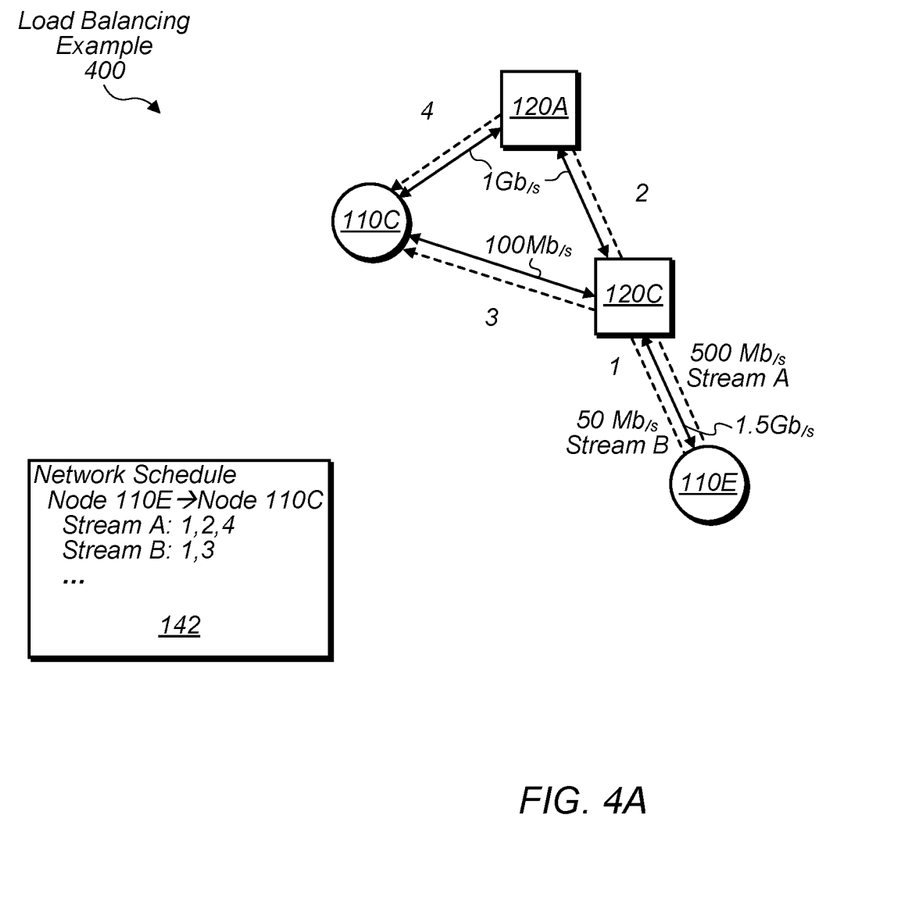
FIGS. 4A-4C are examples illustrating how a network schedule can account for different demands for communicating streams.

Turning now to FIG. 4A, an example 400 of load balancing is depicted. As noted above, in some embodiments, network planner 140 may create a network schedule 142 that balances traffic between two nodes 110 across multiple paths connecting the nodes 110. Accordingly, as shown, nodes 110E may be connected to node 110C via a first path that includes links 1, 2, and 4 (links 130G, 130I, and 130K in FIG. 1) and a second path that includes links 1 and 3 (links 130G and 130L). As also shown, links 1, 2, 3, and 4 may support bandwidths of 1.5 Gb/s, 1 Gb/s, 100 Mb/s, and 1 Gb/s, respectively. In example 400, node 110E intends to communicate a 500 Mb/s stream A and 50 Mb/s stream B to node 110C. As discussed above, in various embodiments, network planner 140 is executable to take these characteristics into consideration and generate an appropriate network schedule 142. For example, as shown, planner 140 generates a schedule 142 that routes stream A over the path of links 1, 2, and 4 and routes stream B over the path of links 1 and 3. It is also worth noting, in this example, that planner 140 is able to take into consideration both network ports of node 110C—i.e., its network port coupling it to link 4 and its network port coupling it to link 3. In doing so, planner 140 creates a more balanced distribution of loads across the paths and thus frees up bandwidth for more rate-constrained streams over links 1, 2, and 4.

Figure 4B:
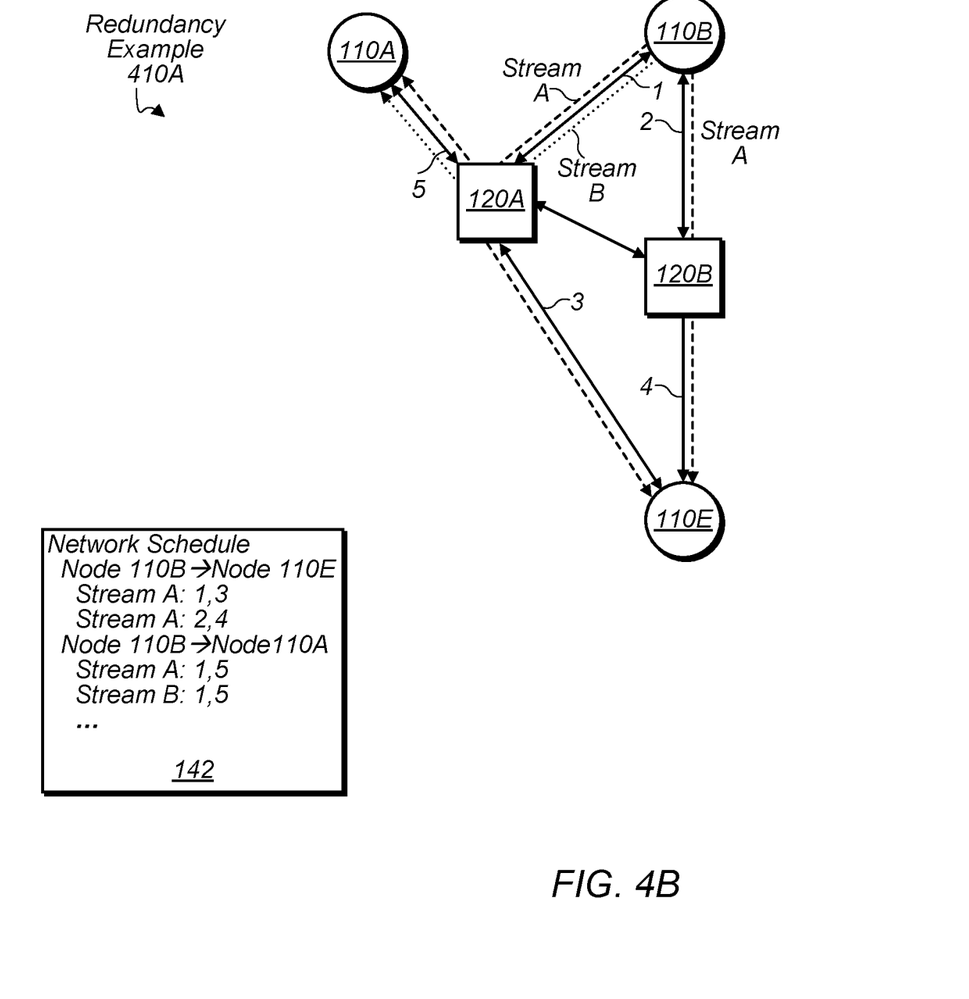

Turning now to FIG. 4B, an example 410A of communicating a stream redundantly within the context of multicasting is depicted. As noted above, in some embodiments, a given node may multicast a stream to multiple nodes 110 such that the stream is communicated redundantly to one or more of the nodes 110 participating in the multicast. Accordingly, as shown, node 110B may intend to multicast a stream A to nodes 110A and 110E and to send a stream B to node 110A. In this example, a demand may also exist to provide at least two instances of stream A to node 110E. As a result, planner 140 may create a schedule 142 that routes a first instance of stream A from node 110B to node 110E over a path that includes links 1 and 3 and a second instance of stream A over a path that includes links 2 and 4. Schedule 142 may also route a single instance of stream A and stream B over the path of links 1 and 5 to node 110A. Although not shown, in some embodiments, schedule 142 may specify that switch 120A is to duplicate stream A and communicate stream A out of its network ports associated with both link 5 and link 3. Notably, in this example, network planner 140 is not conveying redundant copies of stream A to node 110A as well as to node 110E since node 110E is the only node intended to receive redundant instances in this example. Furthermore, it is noted that, in the illustrated embodiment, network planner 140 is capable of generating a network schedule 142 that specifies transmission of a redundant stream in a network (i.e., LAN 100) in which redundant paths do not exists between each node in the network (i.e., only one path exists to Node 110A).

Figure 4C:
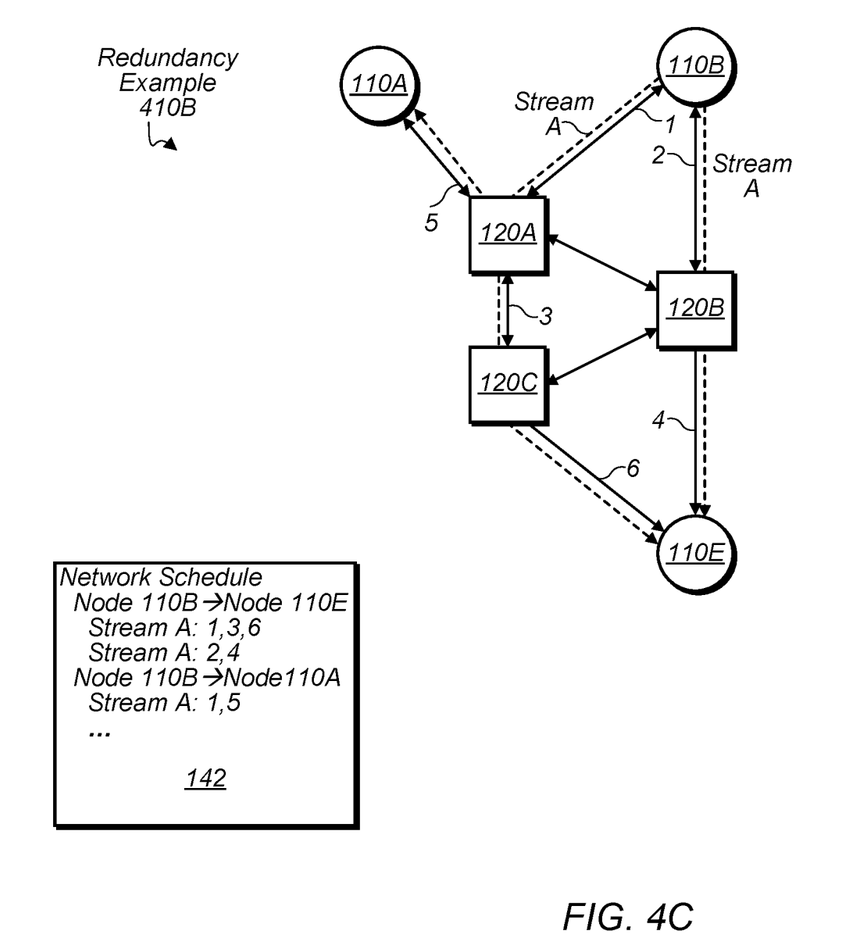

Turning now FIG. 4C, another example 410B of communicating a stream redundantly is depicted. In various embodiments, network planner 140 is capable of not only supporting redundant communications, but also creating a schedule 142 to route two or more instances of a stream over asymmetric paths. Accordingly, as shown, network planner 140 may create a network schedule 142 that routes one instance of stream A over a path through three links 1, 3, and 6 and another instance of stream A over a path through two links 2 and 4. These paths stand in contrast to example 410A in which stream A is routed over two symmetric paths as both of those paths merely include two links as discussed above. Being able to route redundant instances of a stream over asymmetric may be advantageous when, for example, symmetric paths do not exist between two nodes 110. It may also be advantageous when routing a stream in this manner also for greater bandwidth utilization and/or for lesser latencies.

Figure 5:
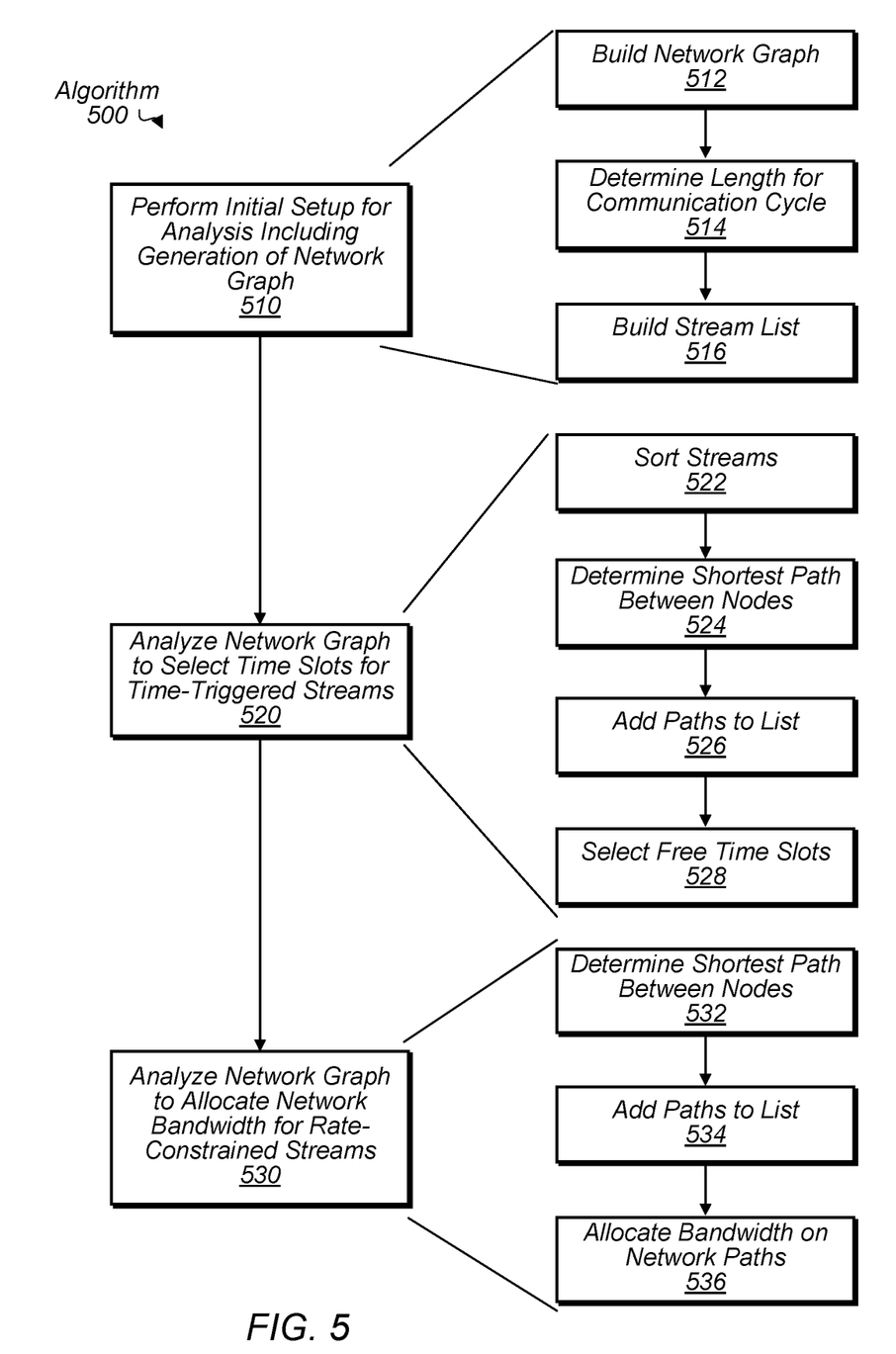
FIG. 5 is a flow diagram illustrating an example algorithm for determining a network schedule.

Turning now to FIG. 5, a flow diagram of an algorithm 500 for determining a network schedule is depicted. Algorithm 500 is one embodiment of an algorithm that may be implemented by network planner 140 to generate network schedule 142. In some embodiments, algorithm 500 may be implemented differently than shown.

In step 510, an initial setup is performed for analysis conducted in steps 520 and 530. In one embodiment, this setup includes processing network topology 210 to build a bidirectional graph representative of LAN 100 at substep 512 such that nodes 110 and switches 120 are represented by nodes in the graph and links 130 are represented by uniquely identified edges between nodes. A length for the communication cycle is also determined at substep 514 by examining the transmission intervals for each time-triggered stream (as identified in stream information 220) and finding the least common multiple of all the periods. A list of time-triggered streams is built at substep 516 and stored by transmission intervals from shortest to longest.

In step 520, the network graph is analyzed to place time-triggered streams in schedule 142. In one embodiment, this analysis includes at substep 522 sorting the time-triggered streams based on transmit interval and attempting to schedule the stream with the shortest interval first. For each destination node, the shortest weighted path from the source node to that destination node is determined at substep 524, where preference is given to paths determined for other nodes in order to reuse paths. In some embodiments, the shortest path may be identified using an application of Dijkstra's shortest-path algorithm. These determined paths are then added to a list of paths for communicating the stream at substep 526. If a destination node is to receive redundant transmissions of the stream, a copy of the network graph is created, but the path already selected for transmitting the first instance of the stream is removed in order to select a second, different path for transmitting the second instance of the stream. This second path is then added to the list of paths for communicating the stream. Other paths may be selected in a similar manner if additional redundant paths are demanded for a particular stream. If not enough paths can be found, an error may be generated. Once the list of paths is complete, free time slots associated with the paths are selected and marked as being unavailable at substep 528. In some embodiments, when time slots are selected, additional guard bands may be added to these time slots to account for potential jitter caused by lower priority interfering traffic. If not enough free slots are found, an error may be generated. As paths are selected, weights for each edge are then updated by the amount of time used by the streams.

In step 530, the network graph is analyzed to place rate-constrained streams in schedule 142. In one embodiment, this analysis includes at substep 532 determining, for each rate-constrained stream and for each destination node of that stream, the shortest weighted path from the source node to that destination node, where preference is given to paths determined for other nodes in order to reuse paths. Determined paths are then add to a list of paths for communicating that stream at substep 534. If a destination node is to receive redundant transmissions of a stream, a copy of the network graph is created, but the already selected path for the first transmission is removed in order to select a second, different path for the second transmission. If found, this second path is added to the list of paths. Additional redundant paths may be selected in a similar manner. If not enough paths can be found, an error may be generated. As bandwidth is allocated on network paths at substep 536, the weight of each edge of the paths is updated by the amount of time used by the stream in order to ensure that the aggregate bandwidth of all streams fits on the paths.

Figure 6:
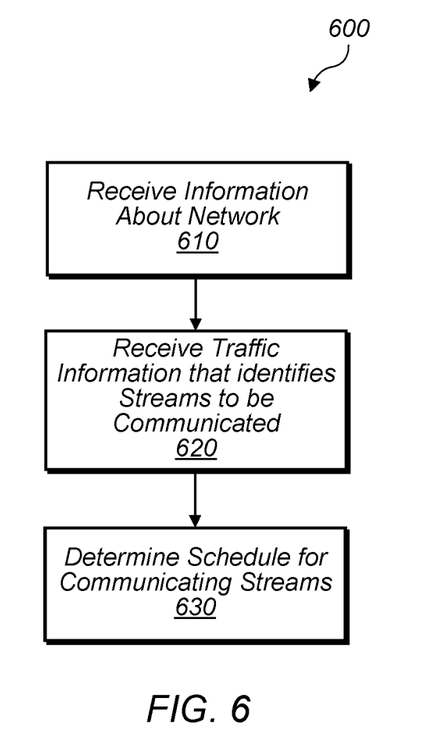
FIG. 6 is a flow diagram illustrating an example method for enhancing network communication.

Turning now to FIG. 6, a flow diagram of a method 600 for enhancing communication of traffic across a network is depicted. Method 600 is one embodiment of a method that may be performed by a computer system such as one executing network planner 140. In some instances, performance of method 600 may allow for better utilization of a network's limited resources.

In step 610, a computer system receives information about a network (e.g., network topology 210). In one embodiment, the information indicates that a first node of the network includes a network interface having a first port and a second port.

In step 620, the computer system receives traffic information (e.g., stream information 220) that identifies multiple streams that are to be communicated between nodes of a network. In some embodiments, these nodes include network switches.

In step 630, the computer system determines a schedule for communicating the streams. In one embodiment, the schedule indicates that the first node is to communicate a first of the streams via the first port and a second of the streams via the second port. In some embodiments, the determining includes selecting the first port for the first stream and the second port for the second stream to balance loads across the first and second ports. In some embodiments, the schedule indicates that a node of the network is to distribute a stream being multicasted to a second node and a third node, and the schedule indicates that the node is to communicate redundant instances of the stream to the second node and a single instance of the stream to the third node. In some embodiments, the indicated node is a network switch.

Exemplary Computer System

Figure 7:
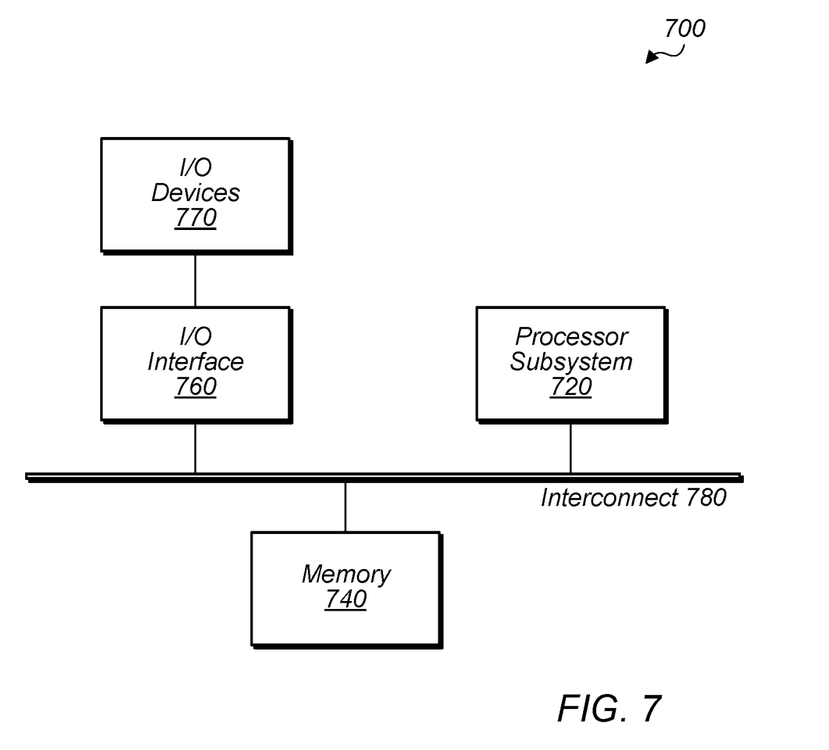
FIG. 7 is a block diagram illustrating an example computer system.

Turning now to FIG. 7, a block diagram of an exemplary computer system 700 is depicted. Computer system 700 is one embodiment of a computer system that may be used to implement one or more of nodes 110 and/or a computer system that executes network planner 140. In the illustrated embodiment, computer system 700 includes a processor subsystem 720 that is coupled to a system memory 740 and I/O interfaces(s) 760 via an interconnect 780 (e.g., a system bus). I/O interface(s) 760 is coupled to one or more I/O devices 770. Computer system 700 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA), an embedded system, etc. Although a single computer system 700 is shown in FIG. 7 for convenience, system 700 may also be implemented as two or more computer systems operating together.

Processor subsystem 720 may include one or more processors or processing units. In various embodiments of computer system 700, multiple instances of processor subsystem 720 may be coupled to interconnect 780. In various embodiments, processor subsystem 720 (or each processor unit within 720) may contain a cache or other form of on-board memory. In some embodiments, network planner 140 described above may be executable by processor subsystem 720.

System memory 740 is usable store program instructions executable by processor subsystem 720 to cause system 700 perform various operations described herein. System memory 740 may be implemented using different physical memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computer system 700 is not limited to primary storage such as memory 740. Rather, computer system 700 may also include other forms of storage such as cache memory in processor subsystem 720 and secondary storage on I/O Devices 770 (e.g., a hard drive, storage array, etc.). In some embodiments, these other forms of storage may also store program instructions executable by processor subsystem 720 to perform operations described herein. Accordingly, in some embodiments, network planner 140 is program instructions stored in system memory 740 that are executable by processor subsystem 720 to perform various operations described herein.

I/O interfaces 760 may be any of various types of interfaces configured to couple to and communicate with other devices, according to various embodiments. In one embodiment, I/O interface 760 is a bridge chip (e.g., Southbridge) from a front-side to one or more back-side buses. I/O interfaces 760 may be coupled to one or more I/O devices 770 via one or more corresponding buses or other interfaces. Examples of I/O devices 770 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 700 is coupled to a network via a network interface device 770 (e.g., configured to communicate over WiFi, Bluetooth, Ethernet, etc.).

Various embodiments of systems, computer readable media, and methods for determining a network schedule are contemplated based on the preceding description, including, but not limited to, the embodiments listed below.

1. A non-transitory computer readable medium having program instructions stored thereon that are executable by a computer system to cause the computer system to perform operations comprising:

receiving topology information describing resources of a network that are usable to communicate a plurality of streams among nodes in the network;

receiving traffic information describing demands for communicating the plurality of streams, wherein the traffic information indicates that a first of the plurality of streams is to be transmitted to a plurality of nodes, and wherein the traffic information further indicates that the first stream is to be transmitted redundantly to a first of the plurality of nodes; and determining, based on the topology information and the traffic information, a network schedule that specifies how the plurality of streams are to be communicated over the network, wherein the network schedule indicates that two instances of the first stream are to be communicated to the first node, and wherein the network schedule indicates that a single instance of the first stream is to be communicated to a second of the plurality of nodes.

2. The computer readable medium of embodiment 1, wherein the topology information includes information about a first path and a second path connecting two nodes; and wherein the traffic information indicates demands for communicating a second stream and a third stream between the two nodes; and wherein the network schedule indicates that the second stream is to be communicated over the first path and that the third stream is to be communicated over the second path.

3. The computer readable medium of embodiment 2, wherein the topology information indicates a supported bandwidth for the first path and a supported bandwidth for the second path;

wherein the traffic information indicates a desired bandwidth as a demand for communicating the second stream; and wherein the determining includes selecting the first path for communicating the second stream based on the supported bandwidths and the desired bandwidth.

4. The computer readable medium of embodiment 1, wherein the network schedule indicates a time slot when the first stream is to be communicated to the plurality of nodes.

5. The computer readable medium of embodiment 1, wherein the determining includes building a graph from the topology information, wherein the graph is representative of the network.

6. The computer readable medium of embodiment 5, wherein the determining includes:

using the graph to select an initial set of time slots for a first type of stream in the plurality of streams; and using the graph to select a subsequent set of time slots for a second type of stream in the plurality of streams.

7. The computer readable medium of embodiment 1, wherein the operations further comprise:

distributing the network schedule to nodes in the network, wherein the network schedule is usable by the nodes to ensure that the demands for communicating the plurality of streams are satisfied.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   a local area network (LAN);
   a plurality of nodes configured to send and receive traffic via the LAN; and
   a computer system that includes a processor and a memory storing program instructions executable by the processor to implement a network planner that performs operations including:
      receiving topology information describing resources of a network that are usable to communicate a plurality of streams among nodes in the network, wherein the topology information includes information about a first path and a second path connecting first and second nodes;
      receiving traffic information describing demands for communicating the plurality of streams, wherein the traffic information indicates separate demands for communicating a first stream and a second stream between the first and second nodes, and wherein the traffic information further indicates that a third stream is to be communicated redundantly to a third node in the network, and that the third stream is to be multicast to the third node and a fourth node; and
      determining, using the topology information and the traffic information, a network schedule that balances traffic between the first and second nodes by indicating that the first stream is to be communicated over the first path and that the second stream is to be communicated over the second path, wherein the network schedule indicates a time slot when the first stream is to be communicated over the first path and indicates a time slot when the second stream is to be communicated over the second path, wherein the network schedule indicates a pair of paths for communicating two instances of the third stream to the third node, and wherein the network schedule indicates that a single instance of the third stream is to be communicated to the fourth node over a particular path; and
      based on the network schedule:
         causing the first stream to be sent via the first path;
         causing the second stream to be sent via the second path;
         causing the third stream to be sent to the third node redundantly over the pair of paths; and
         causing the third stream to be sent to the fourth node over the particular path.

2. The apparatus of claim 1, wherein the topology information indicates a supported bandwidth for the first path and a supported bandwidth for the second path;
   wherein the traffic information indicates a desired bandwidth as a demand for communicating the first stream; and
   wherein the determining includes selecting the first path for communicating the first stream based on the supported bandwidths and the desired bandwidth.

3. The apparatus of claim 1, wherein the determining includes building, from the topology information, a graph representative of the network.

4. The apparatus of claim 3, wherein the determining includes:
   using the graph to select an initial set of time slots for a first type of stream in the plurality of streams; and
   using the graph to select a subsequent set of time slots for a second type of stream in the plurality of streams.

5. The apparatus of claim 1, wherein the nodes include one or more switches, and wherein the network schedule indicates when the one or more switches are to communicate the first and second streams.

6. The apparatus of claim 1, wherein the apparatus is a vehicle, the LAN is a vehicle network, and at least some of the plurality of nodes are electronic control units (ECUs) that control functions of the vehicle.

7. The apparatus of claim 6, wherein the second node is one of the following types of ECUs: steering ECU, motor ECU, brake-system ECU.

8. The apparatus of claim 6, wherein the first and second streams are time-triggered streams for which data is to be sent at different fixed intervals.

9. An apparatus, comprising:
   a processor; and
   memory having program instructions stored therein that are executable by the processor to cause to the apparatus to perform operations including:
      storing a schedule for a network that includes a plurality of nodes, wherein the schedule instructs the apparatus to communicate a plurality of streams including a first stream and a second multicast stream, wherein the schedule specifies that a single instance of the first stream is to be sent to a first of the plurality of nodes, at least two instances of the second multicast stream are to be sent to a second of the plurality of nodes, and a single instance of the second multicast stream is to be sent to a third of the plurality of nodes, and wherein the schedule specifies time slots when the first and second streams are to be sent;
      causing a single instance of the first stream to be sent to the first node;
      causing at least two instances of the second multicast stream to be sent to the second node; and
      causing a single instance of the second multicast stream to be sent to the third node.

10. The apparatus of claim 9, wherein the operations include:
    receiving another stream from one of the plurality of nodes, wherein the schedule specifies when the other stream is to be received.

11. The apparatus of claim 9, wherein the schedule instructs the apparatus to send the first stream via a first network port of the apparatus and the second multicast stream via a second network port of the apparatus.

12. The apparatus of claim 9, wherein the operations include:

receiving a software update for the apparatus via a wide area network, wherein the software update includes the schedule.

13. The apparatus of claim 9, wherein the apparatus is a vehicle, the network is a vehicle network, and at least some of the plurality of nodes are electronic control units (ECUs) that control functions of the vehicle.

14. An apparatus, comprising:
a local area network (LAN);
a plurality of nodes configured to send and receive traffic via the LAN; and
a computer system that includes a processor and a memory storing program instructions executable by the processor to implement a network planner that is executable to perform operations including:
receiving information about the LAN, wherein the information indicates that a first of the plurality of nodes includes a network interface having a first port and a second port;
receiving traffic information that identifies a plurality of streams that are to be communicated between the plurality of nodes; and
determining a schedule for communicating the plurality of streams, wherein the schedule indicates that the first node is to communicate a first of the plurality of streams via the first port and a second of the plurality of streams via the second port, wherein the schedule specifies time slots when the first and second streams are to be sent, wherein the schedule indicates that a second node of the network is to distribute a stream being multicast to a third node and a fourth node, and wherein the schedule indicates that redundant instances of the multicast stream are to be communicated to the third node and a single instance of the multicast stream is to be communicated to the fourth node; and
based on the determined schedule, causing the first stream to be communicated via the first port and the second stream to be communicated via the second port.

15. The apparatus of claim 14, wherein the second node is a switch of the network.

16. The apparatus of claim 14, wherein the determining includes selecting the first port for the first stream and the second port for the second stream to balance loads across the first and second ports.

17. The apparatus of claim 14, wherein the apparatus is a vehicle, the LAN is a vehicle network, and wherein at least some of the plurality of nodes are electronic control units (ECUs) that control functions of the vehicle.

18. An apparatus, comprising:
a local area network (LAN);
a plurality of nodes configured to send and receive traffic via the LAN; and
a computer system that includes a processor and a memory storing program instructions executable by the processor to implement a network planner that performs operations including:
receiving topology information describing resources of a network that are usable to communicate a plurality of streams among nodes in the network, wherein the topology information includes information about a first path and a second path connecting two nodes;
receiving traffic information describing demands for communicating the plurality of streams, wherein the traffic information indicates separate demands for communicating a first stream and a second stream between the two nodes, and wherein the first and second streams are time-triggered streams for which data is to be sent at different fixed intervals; and
determining, using the topology information and the traffic information, a network schedule that balances traffic between the two nodes by indicating that the first stream is to be communicated over the first path and that the second stream is to be communicated over the second path, wherein the network schedule indicates a time slot when the first stream is to be communicated over the first path and indicates a time slot when the second stream is to be communicated over the second path; and
based on the network schedule:
causing the first stream to be sent via the first path; and
causing the second stream to be sent via the second path;
wherein the apparatus is a vehicle, the LAN is a vehicle network, and at least some of the plurality of nodes are electronic control units (ECUs) that control functions of the vehicle.

\* \* \* \* \*